United States Patent [19]

Kondo

[11] Patent Number: 5,251,485
[45] Date of Patent: Oct. 12, 1993

[54] SEMICONDUCTOR ACCELEROMETER

[75] Inventor: Yuji Kondo, Tokyo, Japan

[73] Assignee: NEC Corporation, Tokyo, Japan

[21] Appl. No.: 695,819

[22] Filed: May 7, 1991

[30] Foreign Application Priority Data

May 7, 1990 [JP] Japan .................................. 2-117088

[51] Int. Cl.⁵ ............................................. G01P 15/12
[52] U.S. Cl. ..................................... 73/517 R; 338/2
[58] Field of Search ............. 73/517 B, 517 R; 338/2, 338/3, 5, 46, 43

[56] References Cited

U.S. PATENT DOCUMENTS 3,815,222  6/1974  Mitarai et al. ......................... 29/578
4,869,107  9/1989  Murakami ......................... 73/517 R

FOREIGN PATENT DOCUMENTS 1-301174 12/1989 Japan ................................ 73/517 R

OTHER PUBLICATIONS

Roylance et al, "A Batch-Fabricated Silicon Accelerometer", IEEE Transactions on Electron Devices, vol. ED-26, No. 12 pp. 1911–1917, Dec. 1979.
Davidson et al., "Silicon Accelerometer Technology", Proceedings IECON '86, CH2334-1, Milwaukee, Wis., vol. 1, pp. 218–222, Sep. 29–Oct. 3, 1986.

Primary Examiner—John E. Chapman
Attorney, Agent, or Firm—Foley & Lardner

[57] ABSTRACT

A semiconductor accelerometer comprising a semiconductor base member and an acceleration response member having a semiconductor beam integrally extending from the base member and a semiconductor weight integrally formed at a tip end of the beam so as to deflect the semiconductor beam when the weight is subjected to acceleration. At least one gauge diffusion resistor is formed in the semiconductor beam. The at least one gauge diffusion resistor includes a contact diffusion region which is formed at each end of the at least one gauge diffusion resistor and which has a diffusion concentration higher than that of the at least one gauge diffusion resistor. The contact diffusion region formed at each end of the at least one gauge diffusion resistor is connected to a wiring conductor.

3 Claims, 3 Drawing Sheets

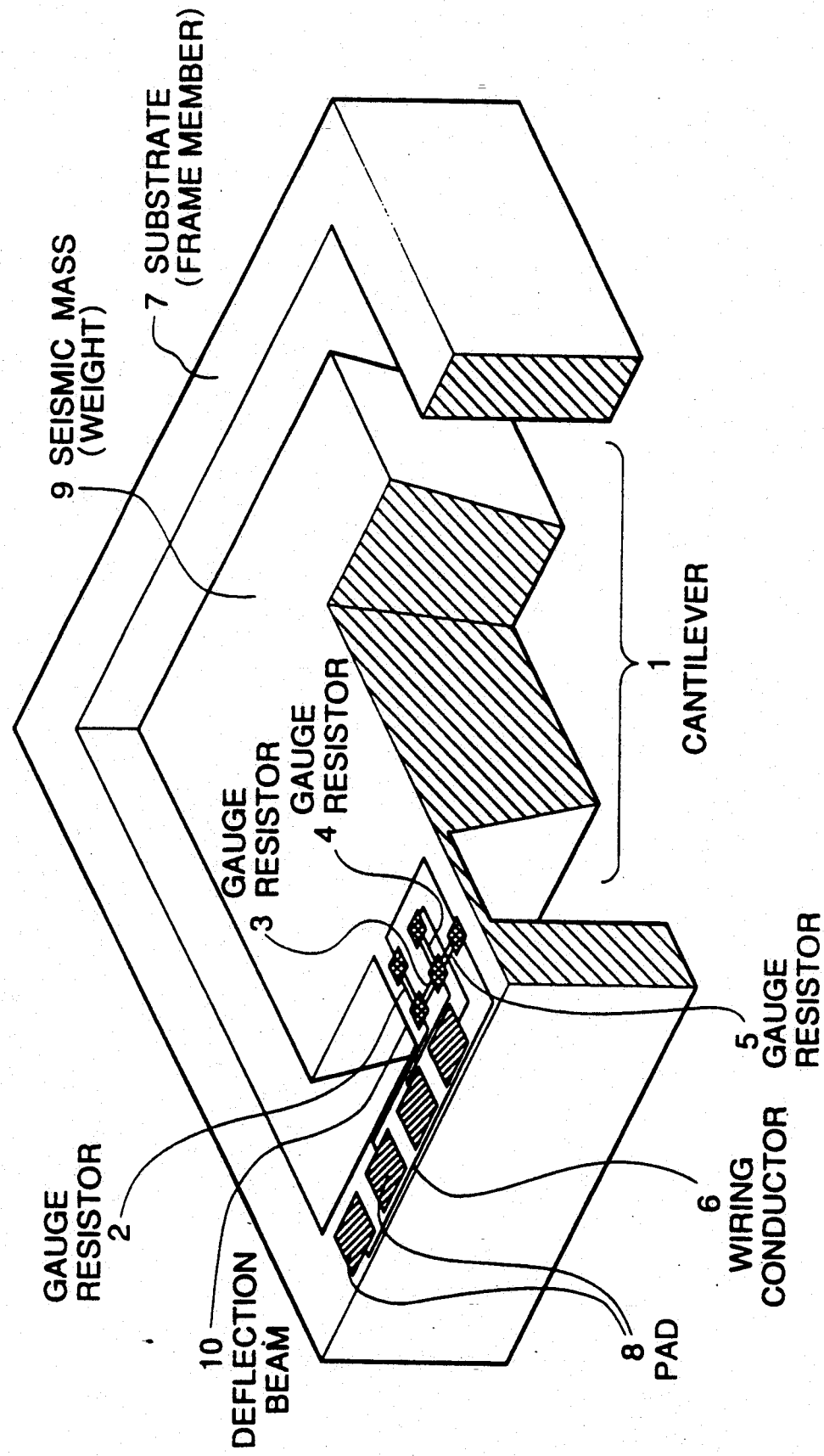

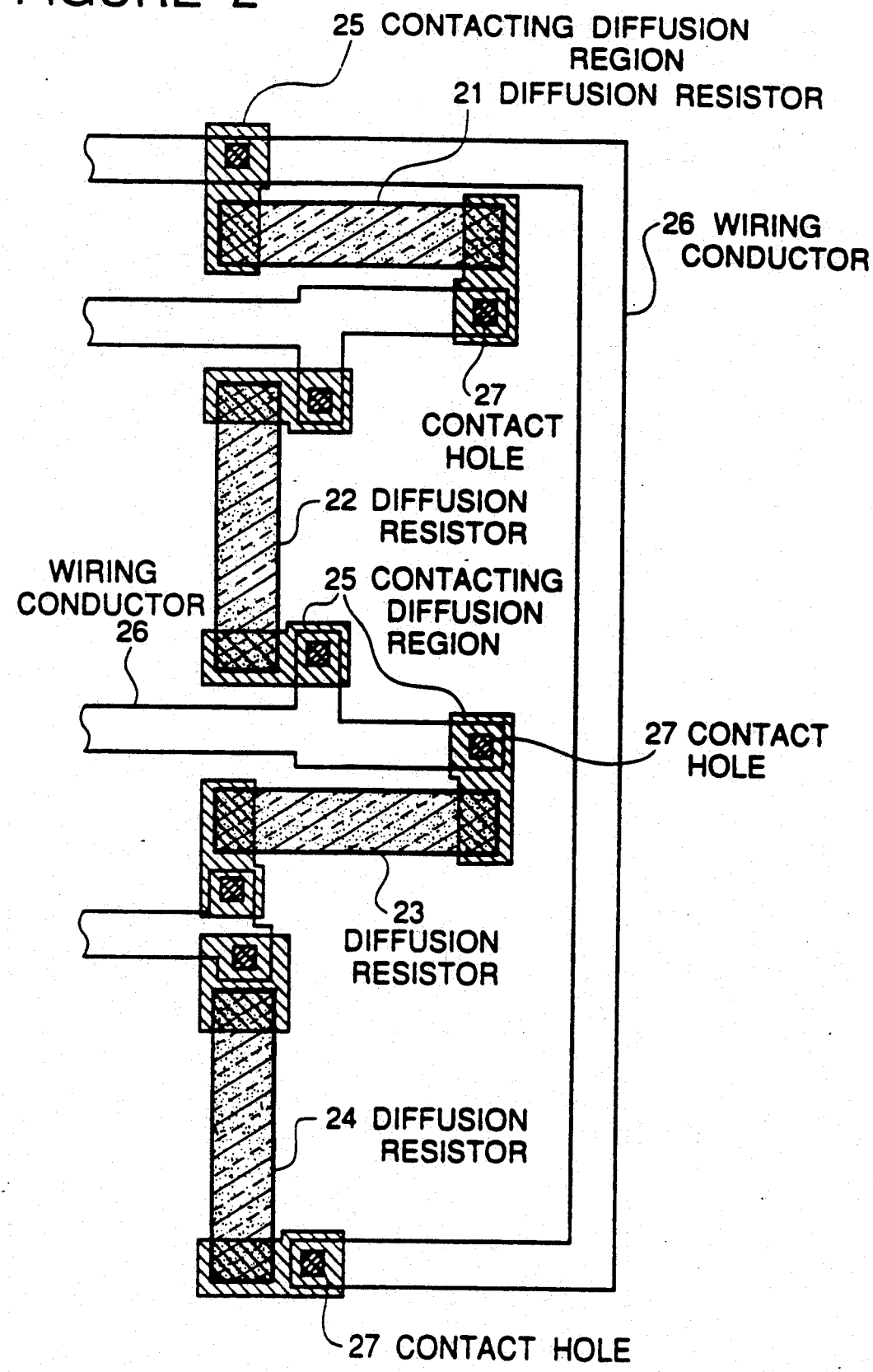

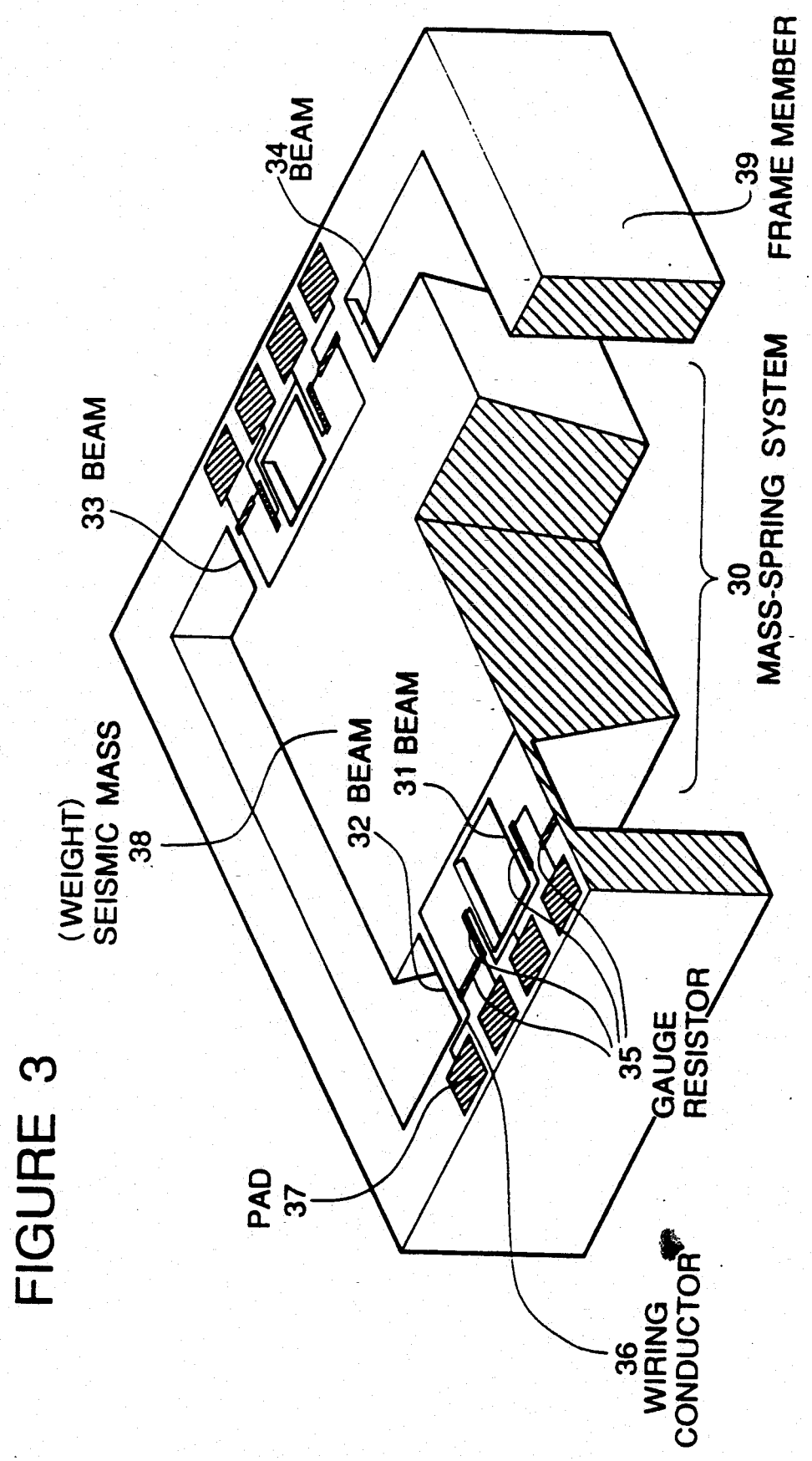

SEMICONDUCTOR ACCELEROMETER

BACKGROUND OF THE INVENTION

1. Field of the Invention

The present invention relates to a semiconductor accelerometer, and more specifically to a semiconductor type accelerometer having a construction which offsets the detrimental effects of thermal properties.

2. Description of Related Art

One typical example of conventional semiconductor accelerometers has included a cantilever composed of a beam portion and a weight portion which are formed by etching a semiconductor substrate, for example, a silicon substrate. In addition, for example, four gauges are formed in the beam portion of the cantilever, so as to able to form a Wheatstone bridge. Each of the four gauges constitutes of a diffusion resistor formed by diffusing impurities into the silicon substrate.

The four gauges resistors (diffusion resistors) are interconnected by wiring conductors, which are formed of for example aluminum on the silicon substrate, so as to form the Wheatstone bridge. Each of four connection nodes of the Wheatstone bridge is connected through wiring conductors, which are also formed on the silicon substrate, to a corresponding one of four external connection pads.

With the above mentioned arrangement, if the semiconductor accelerometer is subjected to any acceleration, the cantilever, particularly the beam portion of the cantilever, is deflected, so that the Wheatstone bridge becomes unbalanced. Because of this imbalance, an output in proportion to the acceleration can be obtained by the Wheatstone bridge formed of the four gauge resistors.

In the above mentioned conventional semiconductor accelerometer, the four gauge diffusion resistors are interconnected so as to form the Wheatstone bridge as mentioned above. Here, assuming that the resistance of each diffusion resistor is R, and a contact resistance between each end of each diffusion resistor and an associated wiring conductor is $\Delta R_3$, a gauge resistance $GR_2$ for each one gauge resistor can be expressed:

$$GR_2 = R + \Delta R_3 \times 2$$

In the above mentioned conventional semiconductor accelerometer, however, the contact resistance is large and has a large variation or scatter, since the diffusion resistor is directly connected to the wiring conductor. As a result, an offset value of the Wheatstone bridge composed of the four gauge resistors significantly varies from one semiconductor accelerometer to another.

In addition, since the diffusion resistance and the contact resistance are different from each other in thermal properties, namely in a temperature coefficient of resistance, the temperature characteristics of the offset of the Wheatstone bridge has a significant variation from one semiconductor accelerometer to another.

SUMMARY OF THE INVENTION

Accordingly, it is an object of the present invention to provide a semiconductor accelerometer which overcomes the above mentioned defects in the conventional one.

Another object of the present invention is to provide a semiconductor accelerometer having a minimum offset value variation and a minimum offset temperature characteristics variation.

The above and other objects of the present invention are achieved in accordance with the present invention by a semiconductor accelerometer comprising a semiconductor base member and an acceleration responsive member having a semiconductor beam integrally extending from the base member and a semiconductor weight integrally formed at a tip end of the beam so as to deflect the semiconductor beam when the weight is subjected to acceleration. At least one gauge diffusion resistor is formed in the semiconductor beam. The gauge diffusion resistor includes a contact diffusion region which is formed at each end of the gauge diffusion resistor and which has a diffusion concentration higher than that of the gauge diffusion resistor. The contact diffusion region formed at each end of the gauge diffusion resistor is connected to a wiring conductor.

The above and other objects, features and advantages of the present invention will be apparent from the following description of preferred embodiments of the invention with reference to the accompanying drawings.

BRIEF DESCRIPTION OF THE DRAWINGS

FIG. 1 is a partially cut-away diagrammatic perspective view of one embodiment of the semiconductor accelerometer in accordance with the present invention;

FIG. 2 is a diagrammatic plan view of a gauge resistor bridge portion of the semiconductor accelerometer shown in FIG. 1;

FIG. 3 is a partially cut-away diagrammatic perspective view of another embodiment of the semiconductor accelerometer in accordance with the present invention.

DESCRIPTION OF THE PREFERRED EMBODIMENTS

Referring to FIG. 1, there is shown a diagrammatic perspective view of one embodiment of the semiconductor accelerometer in accordance with the present invention.

The shown semiconductor accelerometer includes a cantilever 1 formed by three-dimensionally etching a silicon substrate 7, which forms a frame member. The cantilever 1 includes a semiconductor deflection beam 10 integrally extending from the frame member 7 and a semiconductor weight 9 integrally formed with the beam 10 and extending from a tip end of the beam 10. This semiconductor beam 10 has a thickness and a width which are sufficiently smaller that those of the semiconductor weight 9, so as to allow the semiconductor beam 10 to be deflected in a thickness direction when the weight 9 is subjected to acceleration in the thickness direction. Therefore, the weight 9 forms a seismic mass.

Four gauge resistors 2, 3, 4 and 5 are formed on the semiconductor beam 10, and interconnected by wiring conductors formed for example of aluminum, so as to form a Wheatstone bridge. In addition, the gauge resistors 2, 3, 4 and 5 are connected, through wiring conductors 6 formed for example of aluminum, to external connection pads 8 formed on a portion of the frame member 7 adjacent to the beam 10.

As shown in FIG. 2, the gauge resistors 2, 3, 4 and 5 are formed of four diffusion resistors 21, 22, 23 and 24 formed by diffusing impurities into the semiconductor beam 10. First and third diffusion resistors 21 and 23 are oriented in parallel to each other and in parallel to a lengthwise direction of the beam 10, and second and fourth diffusion resistors 22 and 24 are oriented in parallel to each other and in parallel to a widthwise direction of the beam 10 and perpendicularly to the lengthwise direction of the beam 10. In addition, the second diffusion resistor 22 is located between the first and third diffusion resistors 21 and 23, and the third diffusion resistor 23 is located between the second and fourth diffusion resistors 22 and 24.

Each of the four diffusion resistors 21, 22, 23 and 24 has a contact diffusion region 25 formed at each end thereof. Each contact diffusion region 25 has an impurity diffusion concentration higher than that of the associated diffusion resistor 21, 22, 23 or 24. The contact diffusion region 25 formed at each end of each diffusion resistor 21, 22, 23 or 24 is connected to a wiring conductor 26 which is formed on an insulating layer (not shown) deposited to cover an upper surface of the semiconductor substrate, through a contact hole 27 which is formed through the insulating layer (not shown) so as to interconnect the contact diffusion region 25 and the wiring conductor 26. As shown in FIG. 2, the four diffusion resistors 21, 22, 23 and 24 are interconnected so as to form the Wheatstone bridge, and each connection node of the Wheatstone bridge is connected through the wiring conductor 26 to a corresponding one of the external connection pads 8 shown in FIG. 1.

The diffusion resistors 21, 22, 23 and 24 can be formed by a single diffusion process, but the contact diffusion regions 25 are formed by a plurality of diffusion processes, which may include or may not include the diffusion process forming the diffusion resistors 21, 22, 23 and 24.

In the above mentioned arrangement, a contact resistance for each gauge resistor includes a resistance between each diffusion resistor 21, 22, 23 or 24 and the associated contact diffusion region 25, and a contact surface resistance between the associated contact diffusion region 25 and the wiring conductor 26 through the associated contact hole 27. Here, assume that a resistance of each each diffusion resistor 21, 22, 23 or 24 is R, the contact resistance between each diffusion resistor 21, 22, 23 or 24 and the associated contact diffusion region 25 is $\Delta R_1$, and the contact resistance between the associated contact diffusion region 25 and the wiring conductor 26 through the associated contact hole 27 is $\Delta R_2$. In this case, a resistance $GR_1$ of each one gauge resistor can be expressed:

$$GR_1 = R + \Delta R_1 \times 2 + \Delta R_2 \times 2$$

Here, comparison will be made between the contact resistances $\Delta R_1$ and $\Delta R_2$ and the contact resistance $\Delta R_3$ of the conventional semiconductor accelerometer mentioned hereinbefore. First, since the contact resistance $\Delta R_1$ is a mutual contacting resistance between two diffusion regions formed in the same silicon substrate, the contact resistance $\Delta R_1$ becomes extremely small. On the other hand, the contact resistances $\Delta R_2$ and $\Delta R_3$ between the wiring conductor 26 made of a conductive material such as aluminum and the diffusion resistor or region formed in the silicon substrate 7 are in proportion to a sheet resistance of the diffusion resistor or region itself. Therefore, the contact resistance $\Delta R_2$ is in proportion to the sheet resistance of the contact diffusion region 25, and the contact resistance $\Delta R_3$ of the conventional semiconductor accelerometer is in proportion to the sheet resistance of the diffusion resistor itself. In general, the sheet resistance of the gauge resistor 2 to 5 is about ten times as large as the sheet resistance of the contact diffusion region 25, the relation of $\Delta R_2 << \Delta R_3$ holds. Therefore, $\Delta R_1 << \Delta R_2 << \Delta R_3$ holds.

In the other words, it can be said that a total contact resistance $\Delta R_1 \times 2 + \Delta R_2 \times 2$ for each gauge resistor in the shown embodiment is remarkably smaller than the contact resistance $\Delta R_3 \times 2$ for each gauge resistor in the conventional example. Therefore, the gauge resistors in the shown embodiment have minimum variation or scatter in the gauge resistance $GR_1$ ($= R + \Delta R_1 \times 2 + \Delta R_2 \times 2$), and accordingly, a minimum offset value in the Wheatstone bridge formed. In addition, since the contact resistance is significantly reduced, influence of a temperature coefficient can be greatly suppressed, and therefore, the offset thermal properties of the gauge resistor can be considerably improved.

Referring to FIG. 3, there is shown a diagrammatic perspective view of a second embodiment of the semiconductor accelerometer in accordance with the present invention. In the first embodiment shown in FIG. 1, the cantilever 1 forms an acceleration response member. In the second embodiment shown in FIG. 3, the acceleration response member is formed of a mass-spring system 30, which includes a weight or seismic mass 38 elastically supported at its opposite sides by four beams 31 to 34 extending from a frame member 39. Specifically, the beams 31 and 32 extend from one side of the frame member 39 to one facing side of the weight 38, and the beams 33 and 34 extend from a side of the frame member 39 opposite to the side from which the beams 31 and 32 extends. The beams 33 and 34 reach a side of the weight 38 opposite to the side to which the beams 31 and 32 are coupled.

In this embodiment, each two gauge resistors 35 are formed in each of the four beams 31 to 34, in such a manner that one of the two gauge resistors 35 extends along a lengthwise direction of the beam and the other of the two gauge resistors 35 extends along a widthwise direction of the beam. The gauge resistors formed on the beams 31 and 32 are interconnected by wiring conductors to form one Wheatstone bridge, each connection node of which is connected through a wiring conductor 36 to a corresponding one of external connection pads 37 formed on a portion of the frame member 39 adjacent to the beams 31 and 32. In addition, the gauge resistors formed on the beams 33 and 34 are interconnected by wiring conductors to form another Wheatstone bridge, each connection node of which is connected through a wiring conductor 36 to a corresponding one of external connection pads 37 formed on a portion of the frame member 39 adjacent to the beams 33 and 34.

Similarly to the first embodiment, each of the gauge resistors 35 has a diffusion resistor formed in the semiconductor beam, and one contact diffusion region which is formed at each end of the diffusion resistor and which has a diffusion concentration higher than that of the diffusion resistor.

The invention has thus been shown and described with reference to the specific embodiments. However, it should be noted that the present invention is in no way limited to the details of the illustrated structures but changes and modifications may be made within the scope of the appended claims.

I claim:

1. A semiconductor accelerometer comprising:
   a semiconductor frame member;
   a mass-spring system having a seismic mass elastically supported at its opposite sides by a plurality of beams extending from the semiconductor frame member, wherein a first pair of said beams extend from one side of the semiconductor frame member to one facing side of the seismic mass, and a second pair of the beams extend from a side of the semiconductor frame member opposite to said one side of the semiconductor frame member from which the first pair of beams extends, said second pair of beams reaching a side of the seismic mass opposite to the side to which the first pair of beams are coupled; and
   a pair of gauge resistors formed in each of the beams such that one of the gauge resistors extends along a lengthwise direction of the beams and the other of the gauge resistors extends along a widthwise direction of the beams, wherein
   said gauge resistors formed in the first pair of beams being interconnected to form a first Wheatstone bridge, each connection node of which is connected through a wiring conductor to a corresponding one of external connection pads formed on a first portion of the semiconductor frame member adjacent to the first pair of beams,
   said gauge resistors formed in the second pair of beams being interconnected to form a second Wheatstone bridge, each connection node of which is connected through a wiring conductor to a corresponding one of external connection pads formed on a second portion of the semiconductor frame member adjacent to the second pair of beams, and
   said gauge resistors having diffusion resistors and contact diffusion regions, each of said contact diffusion regions is formed at each end of the diffusion resistors and has a diffusion concentration which is higher than that of the diffusion resistors.

2. A semiconductor accelerometer claimed in claim 1 wherein each of said diffusion resistors is connected to form a series circuit in such a manner that one contact diffusion region of one end of one diffusion resistor is connected to another contact diffusion region of one end of another diffusion resistor.

3. A semiconductor accelerometer claimed in claim 2 wherein said one contact diffusion region of said one end of said one diffusion resistor is connected to said another contact diffusion region of said one end of said another diffusion resistor by the wiring conductor which has a first end connected through a contact hole to said one contact diffusion region of said one end of said one diffusion resistor and which also has a second end connected through another contact hole to said another contact diffusion region of said one end of said another diffusion resistor.

* * * * *